Oct. 12, 1943.  R. L. LINCOLN  2,331,787
CINDER COLLECTOR
Filed March 28, 1941

INVENTOR
ROLAND L. LINCOLN
BY Robert T. Palmer
ATTORNEY

Patented Oct. 12, 1943

2,331,787

UNITED STATES PATENT OFFICE 2,331,787

CINDER COLLECTOR

Roland L. Lincoln, Dedham, Mass., assignor to B. F. Sturtevant Company, Boston, Mass.

Application March 28, 1941, Serial No. 385,699

2 Claims. (Cl. 183—79)

This invention relates to separators for removing solid particles from gases and relates more particularly to primary separators and concentrators for connection to the inlets of induced draft fans for removing cinders therefrom.

This invention provides a primary collector and concentrator utilizing direction changing deflectors extending across the face of the gas stream in association with tangential skimmers for removing the solid particles.

A feature of the invention resides in splitting each gas stream for supply into the inlet of an induced draft fan, into two streams with deflectors and skimmers for each of the two streams. This provides a compact, efficient space saving collector, particularly suitable for connection into the duct work to the inlet of an induced draft fan.

An object of the invention is to provide a compact, efficient collector particularly suitable for connection to the inlet of an induced draft fan.

Another object of the invention is to reduce the size of primary concentrators.

The invention will now be described with reference to the drawing, of which:

Figure 1:
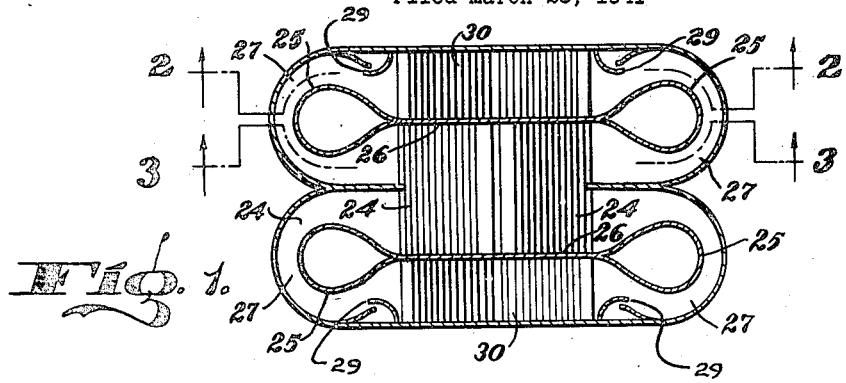
Fig. 1 is a plan view in section of two primary concentrators combined in a single casing for connection in a vertical duct to the two inlets of an induced draft fan and is taken along the lines 1—1 of Fig. 2.
Figure 2:
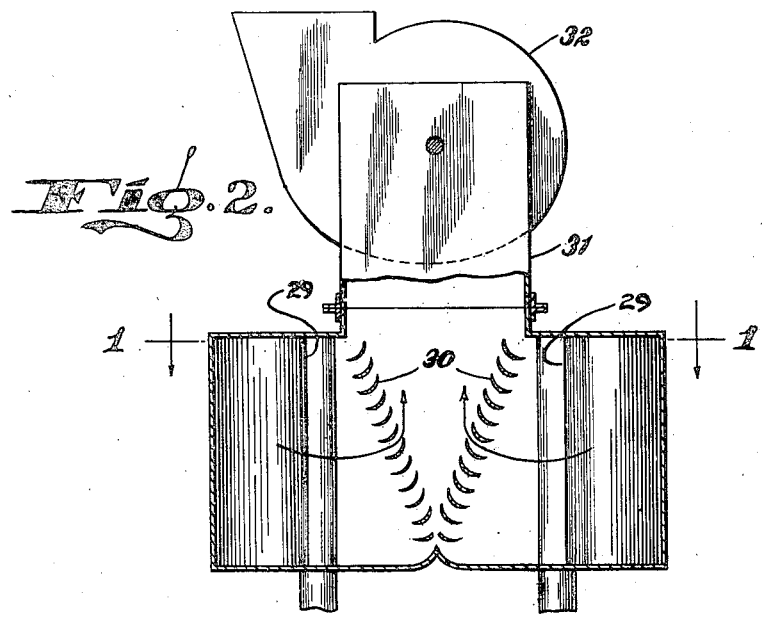
Fig. 2 is a sectional view along the lines 2—2 of Fig. 1.
Figure 3:
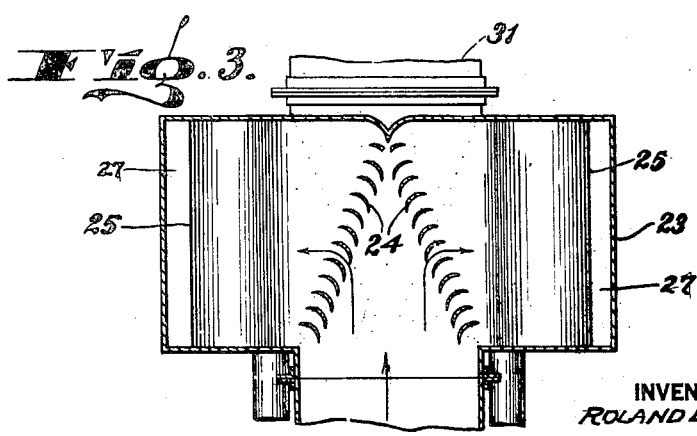
Fig. 3 is a sectional view along the lines 3—3 of Fig. 1.

The drawing illustrates concentrators which are adapted for use with an induced draft fan having vertical inlet ducts. The flue gas from the vertical duct 22 enters the concentrators 23 and is deflected by the deflectors 24 arranged in inverted V's around the rounded ends 25 of the partitions 26 into the curved passages 27 formed between the curved end walls of the concentrators and the curved ends 25 of the partitions 26. The gas is then deflected by the curved end walls of the concentrators and the cinders are skimmed off by the skimming lips 29 which extend into the outer periphery of the curved path and which form tangential skimming channels which discharge into the cinder channels which extend below the concentrators for connection to cyclone type secondary collectors. The clean gas then passes in contact with the deflectors 30 arranged in inverted V's on the down-stream side of the partitions 26, and which serve to straighten out the gas flow into the inlet boxes 31 of the induced draft fans 32.

The curved ends 25 of the partitions 26 are so shaped and placed with respect to the curved ends of the collectors and the skimming lips 29, that the gas passages 27 have uniform widths all the way to the lips 29, and that the gas travels in a curved path of more than 180° before collection takes place at the lips 29. Tests have shown these features result in increased efficiency of collection.

The up-stream deflectors, in the concentrators arranged in inverted V's, serve to cause the gas to follow the desired curved path with minimum eddy current and friction losses, and the down-stream deflectors arranged in V's serve to straighten out the stream-lines of the clean gas flow for proper discharge into the fan inlet boxes.

The concentrator illustrated is particularly suitable for connection to a two inlet induced draft fan having vertical inlet ducts. A Y transformation connection is usually required and according to this invention, the collector serves as the transformation box and therefore requires no additional space.

While the invention has been described for association with induced draft fans handling flue gases containing cinders, other gases containing other small particles may, of course, be handled in other locations. The term "cinder" is intended to include small particles of any substance.

While an embodiment of the invention has been described for the purpose of illustration, it should be understood that the invention is not limited to the exact apparatus and arrangement of apparatus illustrated as modifications thereof may be suggested by those skilled in the art without departure from the essence of the invention.

What is claimed is:

1. A cinder collector comprising a casing having a substantially vertical gas inlet duct and a substantially vertical gas outlet duct and having curved end walls therebetween, a partition having curved end walls extending cross-wise said collector between said walls but spaced therefrom and forming two curved gas flow passages between said walls and said curved ends, a plurality of substantially horizontally extending curved, spaced deflectors arranged in an inverted V with respect to gas flow between said partition and said inlet for deflecting the gas from said inlet in curved flow into said passages, means forming skimmers extending into said passages between said partition and said outlet and forming tangential skimming channels for skimming off cinders thrown by centrifugal force against said walls, and means forming cinder disposal passages communicating with said channels and extending downwardly of said collector.

2. A cinder collector comprising a casing having a substantially vertical gas inlet duct and a substantially vertical gas outlet duct and having curved end walls therebetween, a partition having curved end walls extending crosswise said collector between said walls but spaced therefrom and forming two curved gas flow passages between said walls and said curved ends, a plurality of substantially horizontally extending curved, spaced deflectors arranged in an inverted V with respect to gas flow between said partition and said inlet for deflecting the gas from said inlet in curved flow into said passages, means forming skimmers extending into said passages between said partition and said outlet and forming tangential skimming channels for skimming off cinders thrown by centrifugal force against said walls, a second plurality of substantially horizontally extending curved, spaced deflectors extending cross-wise the gas passage between said channels and said outlet for straightening out the gas flow to said outlet, and means forming cinder disposal passages communicating with said channels and extending downwardly of said collector.

ROLAND L. LINCOLN.